United States Patent
Nguyen (10) Patent No.: US 10,863,818 B2
(45) Date of Patent: Dec. 15, 2020

(54) SMART TOOTHBRUSH

(71) Applicant: Hien Ba Nguyen, Ho Chi Minh (VN)

(72) Inventor: Hien Ba Nguyen, Ho Chi Minh (VN)

(73) Assignee: Hien Ba Nguyen, Ho Chi Minh (VN)

( * ) Notice: Subject to any disclaimer, the term of this patent is extended or adjusted under 35 U.S.C. 154(b) by 0 days.

(21) Appl. No.: 16/141,948

(22) Filed: Sep. 25, 2018

(65) Prior Publication Data

US 2020/0037740 A1 Feb. 6, 2020

Related U.S. Application Data (63) Continuation of application No. 16/023,325, filed on Jun. 29, 2018, now abandoned.

(51) Int. Cl.
*A46B 9/04* (2006.01)
*A61C 17/00* (2006.01)
*A46B 15/00* (2006.01)
*A46B 5/00* (2006.01)

(52) U.S. Cl.
CPC ............ *A46B 9/045* (2013.01); *A46B 5/0095* (2013.01); *A46B 15/0012* (2013.01); *A61C 17/00* (2013.01); *A46B 2200/1066* (2013.01)

(58) Field of Classification Search
CPC .......... A46B 9/045; A46B 15/00; A61C 17/00
See application file for complete search history.

(56) References Cited

U.S. PATENT DOCUMENTS

| | | | | |
|---|---|---|---|---|
| 3,163,874 A | * | 1/1965 | Bauer | A46B 9/045 15/167.1 |
| 3,615,443 A | * | 10/1971 | Smith | G03F 7/06 430/264 |
| 4,224,710 A | * | 9/1980 | Solow | A46B 9/045 15/22.1 |
| 5,337,435 A | * | 8/1994 | Krasner | A61C 17/0211 15/22.1 |
| 8,635,731 B2 | * | 1/2014 | Garner | A46B 9/045 15/22.1 |
| 10,314,679 B2 | * | 6/2019 | Blank | A61C 17/3481 |
| 10,548,698 B2 | * | 2/2020 | Fitzgerald | A61C 17/16 |
| 2009/0229062 A1 | * | 9/2009 | Filby | A46B 9/045 15/22.1 |
| 2016/0135581 A1 | * | 5/2016 | Pai | A46B 5/0095 433/216 |
| 2019/0046308 A1 | * | 2/2019 | Cameron | A61C 17/349 |
| 2020/0237491 A1 | * | 7/2020 | Silverberg | A61C 17/222 |

* cited by examiner

*Primary Examiner* — Sarah B McPartlin (57) ABSTRACT

A smart toothbrush is disclosed which includes a chewing base having an arch shape with varying surface areas and widths that conform to a biting pattern of an upper and lower jaws of a user; an array of bristles covering only the surface areas of the bottom side and top side so that when the user chews on the device, the array of bristles brushes the front, back, and biting surfaces of all the teeth of the upper jaw and said lower jaw, and the height of said array of bristles is 0.8 mm; and a removable handle connected to the chewing base.

20 Claims, 8 Drawing Sheets

SMART TOOTHBRUSH

CLAIM OF PRIORITY

This application claims priority under 35 U.S.C. § 119 of an application No. 1-2018-02722, entitled "A Smart Toothbrush", filed on Jun. 26, 2014, in the Socialist Republic of Vietnam.

FIELD OF THE INVENTION

The present invention relates generally to the field of toothbrushes designed to improve oral health in children. More specifically, the present invention relates to toothbrushes for children without any brushing action associated with the movement of the hand and without toothpastes.

BACKGROUND ART

Overtime basic investigations and studies drawn from the clinical data and statistics of the pediatric faculty show that the majority of tooth cavities and plaques are caused by food residues located on the chewing sides and hard outer surfaces of children teeth. Dental plaque is also known as microbial plaque which is the major cause of gum diseases (e.g., gingivitis and periodontitis) and dental decays. In addition, the research results from the studies of dental diseases in both children and adults, particularly in the children, researchers, dentists unanimously conclude that the main causes contributing to the widespread of dental cavities include: (1) improperly tooth brushing: children do not brush their teeth correctly according to a skill acquired from parental coaching and teaching; (2) Tooth brushing is not fun task: To the children, tooth brushing after each meal and before bedtime are only not fun and also considered a grudge—a forced labor to the point that they refused to open their mouths and even cried as their guardians (e.g., parents, relatives, babysitters, etc.) were trying to help them brushing their teeth with conventional toothbrushes.

Adults and children usually don't understand the benefits of having healthy teeth and gums. Periodontal diseases and dental caries are caused mainly by acidic plaques. Plaque is a thin, sticky film loaded with bacteria, Beside the issue of appearance, unhealthy teeth and gums are associated to other health issues and well-being such as mastication, nutrition, grow rate, coronary heart disease, cerebrovascular accidents (CVAs), diabetes, and mental developments such as self-esteem and focus. The single best way to remove harmful acidic plaques from teeth and gums is to brush teeth regularly and correctly.

In a U.S. Pat. No. 3,769,652, Carrado Rainier disclosed a U-shaped chewing toothbrush which is an attempt to solve teeth brushing problems for children. In the Rainier's chewing toothbrush, a U-shaped head includes soft bristles arranged parallel to the lateral surfaces of the teeth. These lateral bristles scrub the surface and the interstices of the teeth as users chew on the device. However, as mentioned above, the issues to children teeth is the chewing surfaces of the teeth such as the molar and premolar teeth which the Rainier's toothbrush fail to address. Furthermore, the thickness (surface area) of the Rainier's U-shaped chewing brush is constant and therefore the bristles fail to conform to the shape of a child's teeth structure in their jaws. Therefore, Rainier's constant width U-shaped fails to reach to the crevices and biting sides of child's teeth. Furthermore, lateral bristles tend to scrub and irritate the periodontal gums, causing the child to refuse to use Rainier's toothbrush.

In addition, it is difficult to force children to open their mouths to chew on the conventional toothbrush that they do not like. As seen, there are not any fun and attractive features to cause a child to use the Rainier's toothbrush. Furthermore, Rainier's toothbrush does not help parents and dentists to follow with the child's oral health, brushing history, and temperature. These indicators are helpful to follow and guide a child to a good oral and physical health as well as his/her development.

Therefore what is needed is a toothbrush that is effective in solving the all brushing problems for children, attractive, fun to use, and inexpensive.

Furthermore, what is needed is a toothbrush that solves the two main problems causing dental cavities, decays, and periodontal diseases described above.

Yet, what is needed is a toothbrush that helps parents and dentists to observe and follow the oral health and overall health of their children.

SUMMARY OF THE INVENTION

Accordingly, an objective of the present invention is to provide a smart toothbrush which includes a chewing base having an arch shape with varying surface areas and widths that conform to a biting pattern of an upper and lower jaws of a user; an array of bristles covering only the surface areas of the bottom side and top side so that when the user chews on the device, the array of bristles brushes the front, back, and biting surfaces of all the teeth of the upper jaw and said lower jaw, and the height of said array of bristles is 0.8 mm; and a removable handle connected to the chewing base.

Another objective of the present invention is to provide a smart toothbrush that can record the history of use including biting forces, pH levels, temperatures, etc. each time a user uses the smart toothbrush of the present invention.

Yet another objective of the present invention is to provide a smart toothbrush that is fun for children to use with their favorite music.

Another objective of the present invention is to provide a smart toothbrush that is inexpensive so that every family or dental association can afford.

Another objective of the present invention is to provide a smart toothbrush designed to cause a user to chew thereon, which cause salivary flow and balance the pH level in children mouth because chewing increases salivation by stimulating the salivary glands.

These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
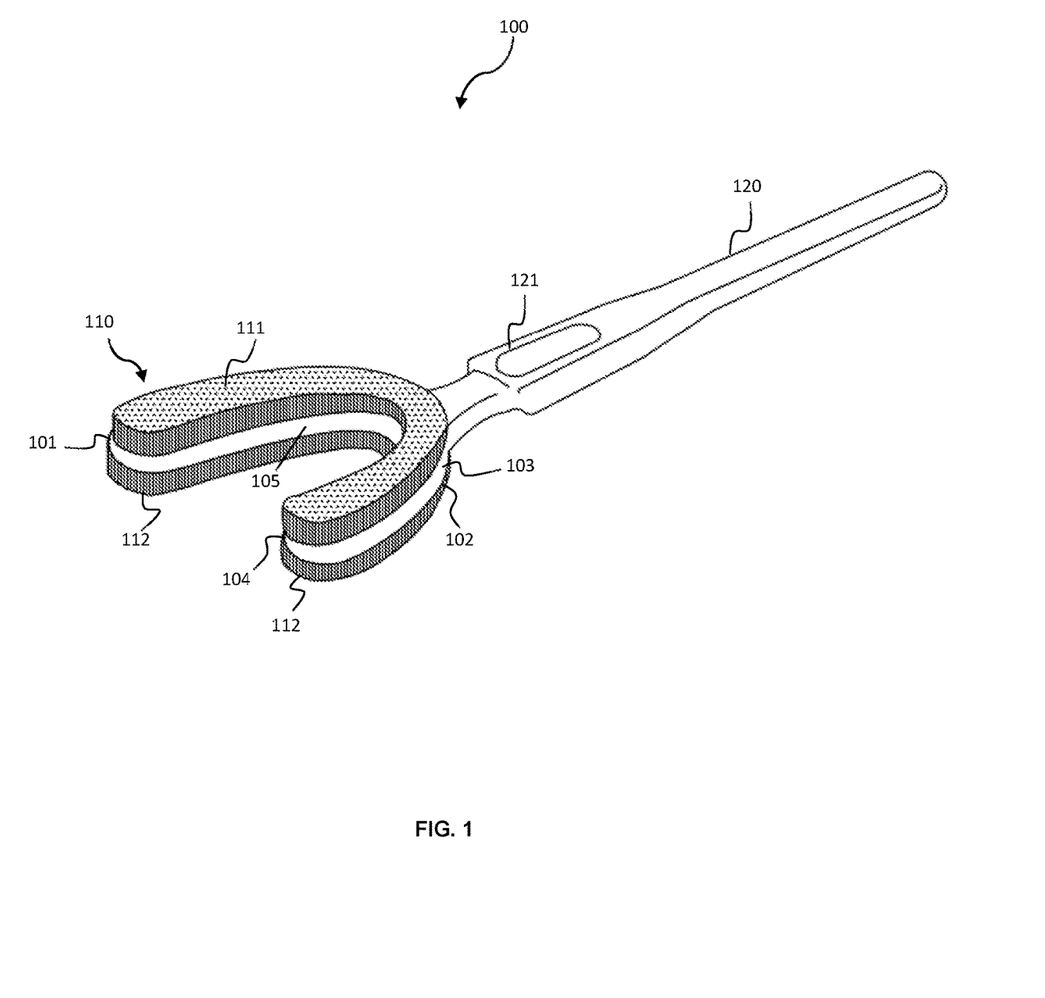
FIG. 1 is a perspective view of a smart toothbrush in accordance with an embodiment of the present invention.

One embodiment of the invention is now described with reference to FIG. 1. FIG. 1 illustrates a perspective view of a smart toothbrush 100 in accordance with an exemplary embodiment of the present invention.

In one aspect, toothbrush 100 includes a chewing base 110 and a handle 120. Chewing base 110 having an arch shape that includes a top side 101, a bottom side 102, a front side 103, a back side 104, a lateral side 105. Top side 101 and bottom side 102 shares the same surface area that varies gradually from front side 103 toward back side 104 where the surface area is maximum. In one implementation, the surface area at front side 103 is 8 mm and gradually increasing toward back side 104 where the surface area is measured at 13 mm. The total length of chewing base 110 is 58 mm. The width at front side 103 is 48 mm while that at back side 104 is 58 mm so that chewing base has a shape of an arch conforming to the biting pattern of the upper jaw and lower jaw of a user.

Continuing with the description of FIG. 1, chewing base 110 also includes a top array of bristles 111 evenly spaced and covering only the surface area of top side 101 and a bottom array of bristles 112 evenly spaced and covering the entire surface area of bottom side 102 so that when the user chews on chewing base 110, first array of bristles 111 and second array of bristles 112 brush against the front, back, and biting surfaces of all the teeth of the upper jaw and the lower jaw of the user. In many embodiments, the height of first array of bristles 111 and second array of bristles 112 is 0.8 mm. In use, back side 104 of toothbrush 100 is inserted into the mouth of the user first so that front side 103 is aligned with the front teeth of the user. The gradually varying surface areas of the arch shaped chewing base 110 of the present invention are designed so that the surface area of back side 104 is matched with the biting areas of premolar and molar teeth and front side 103 is matched with those of canine and incisor teeth. In many implementations of the present invention, chewing base 110 comes in two different sizes: a primary dentition chewing base and a mixed dentition chewing base. Dimensionally, the primary dentition chewing base has an arch length of 48 mm, the molar width of back side 104 of 48 mm, the canine width of front side 103 is 38 mm. The surface area of front side 103 is 5 mm and that of back side 104 is 12 mm. The mixed dentition chewing base has an arch length of 58 mm, the molar width from back side 104 is 58 mm, the canine width on front side 103 is 48 mm, the surface area of top side 101 is 8 mm, and that of bottom side 102 is 13 mm.

Figure 2:
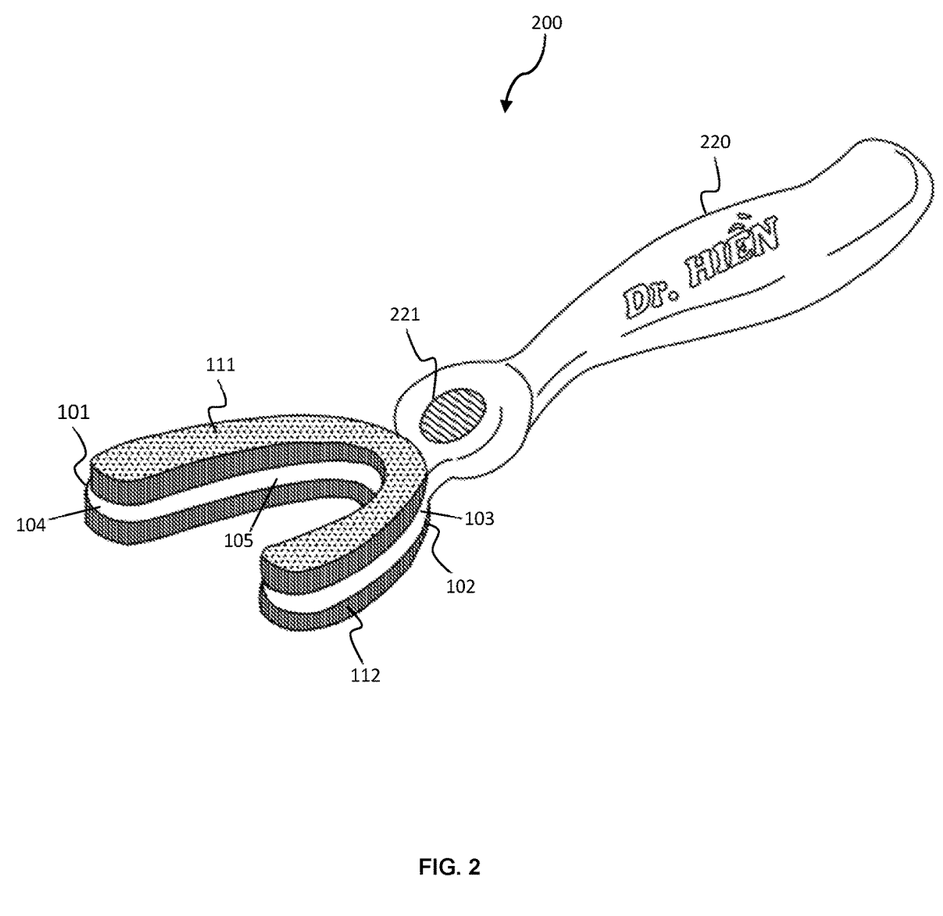
FIG. 2 is a perspective view of a smart toothbrush with an exemplary ergonomic handle in accordance with an embodiment of the present invention.

Now referring to FIG. 2, a perspective view of a toothbrush 200 having different handle shapes in accordance with an exemplary embodiment of the present invention. In one implementation, handle 220 has ergonomic curves for efficient handling is shown. However, other handle shapes such as elephant nose, ice cream cone, lion snout, etc. are within the scope of the present invention. In the implementation as shown in FIG. 2, handle 220 is either permanently connected to or removably connected to the same chewing base 110 as described in FIG. 1. \

Figure 3:
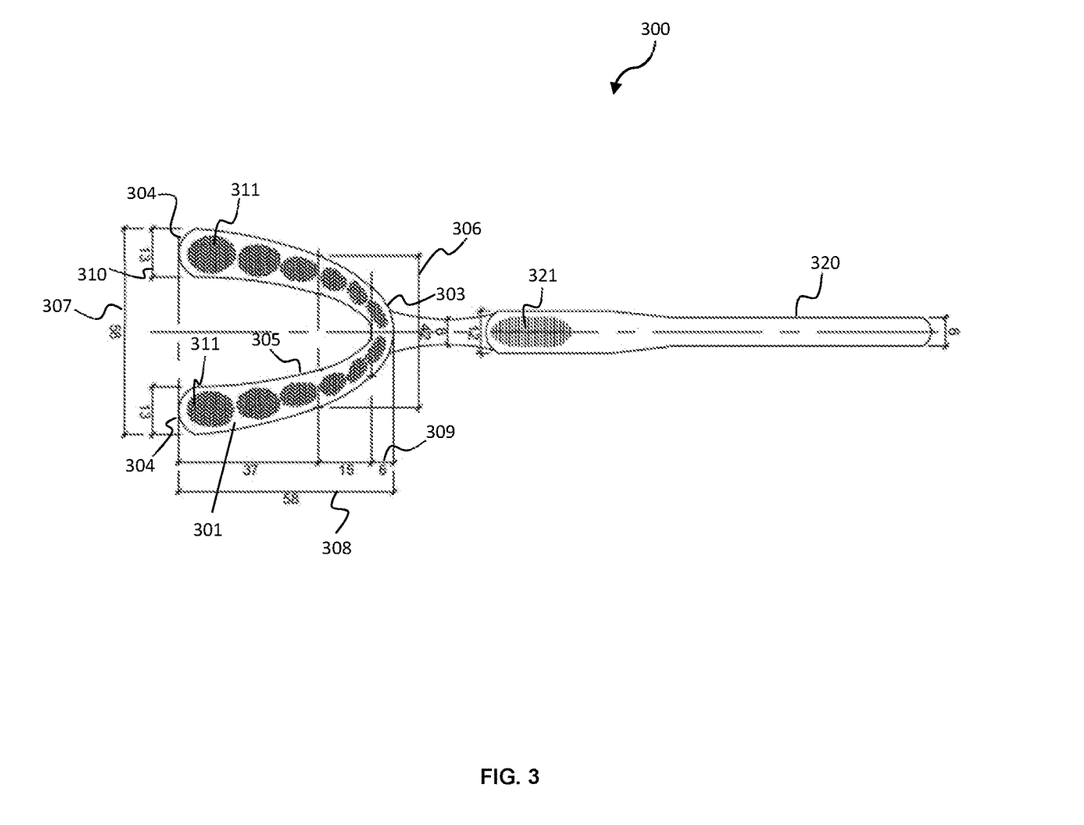
FIG. 3 is a top down planar view of a smart toothbrush having an array of bristles arranged in form of a plurality of islands on the top surface area in accordance with an exemplary embodiment of the present invention.

Next referring to FIG. 3, a top down planar view of a toothbrush 300 having an array of bristles arranged in form of a plurality of islands on the top surface area and the bottom surface area in accordance with an exemplary embodiment of the present invention is illustrated. In this embodiment, first array of bristles 111 and second array of bristles 112 are arranged in a plurality of islands 311 and 312 (on the bottom side, not shown) respectively. The area of each island conform to the biting areas of different teeth such as molar, premolar, incisor, canine teeth. Implementations of chewing base 310 may include one or more of the following features: a canine width (or pitch) 306 of front side 303 is smaller than a molar width (or pitch) 307 of back side 304 and a surface area 309 of front side 303 is smaller than a surface area 310 of back side 304 so that chewing base 310 has the arch shape of a human jaw. Canine width 306 is measured from the central incisors to the canine (cuspid) while molar width 307 is measured from the outside of the molars. Surface area 309 is measured from the two central incisors while surface area 310 is measured by the thickness of the second molar. Similar to exemplary embodiments of FIG. 1-FIG. 2, a handle 320 has a comfort grip handle 321.

Figure 4:
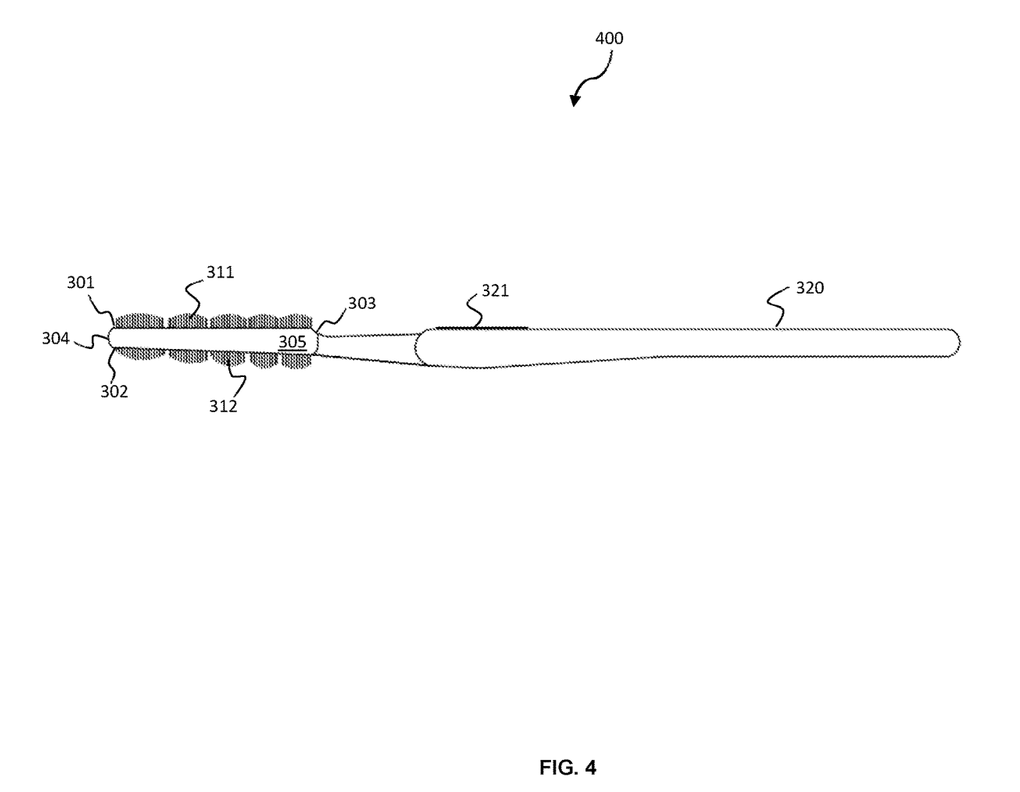
FIG. 4 is a lateral view of a smart toothbrush having an array of bristles arranged in form of a plurality of islands on the top surface area in accordance with an exemplary embodiment of the present invention.

Referring now to FIG. 4, a lateral view of a toothbrush 400 having an array of bristles arranged in form of a plurality of islands on the top surface area in accordance with an exemplary embodiment of the present invention is illustrated. From this view, second array of bristles 312 is seen. In all implementations of the present invention, lateral side 305 does not have any bristles, which is different from the prior art toothbrushes. Prior art lateral bristles are difficult to manufacture and they tend to irritate the gums of the users, especially children.

Figure 5:
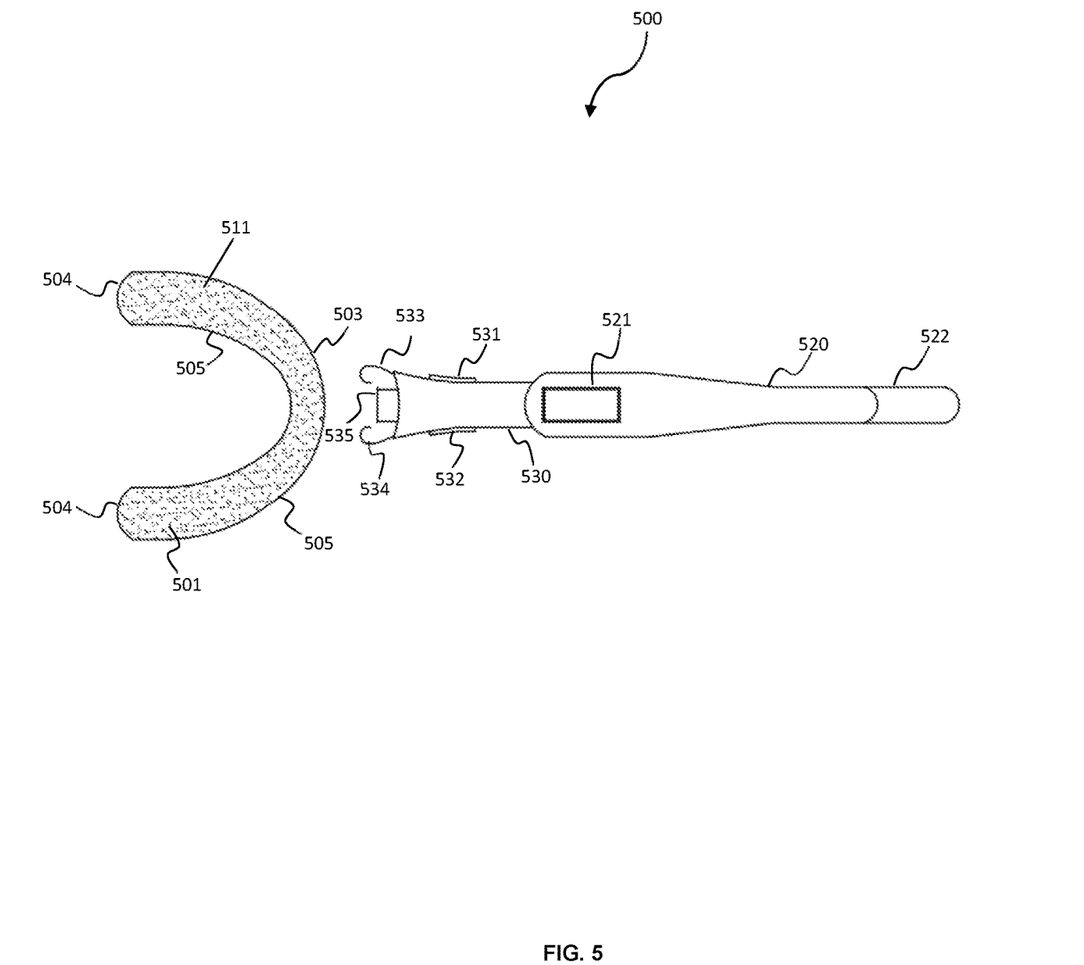
FIG. 5 is a top down planar view of a smart toothbrush having a removable handle with a USB fastener and a display screen in accordance with an exemplary embodiment of the present invention.

Now referring next to FIG. 5, a top down planar view of a toothbrush 500 having a removable handle 520 with a USB fastener and a display screen in accordance with an exemplary embodiment of the present invention is illustrated. In one exemplary embodiment, removable handle 520 includes neck 530 with a pair of buttons 531-532 connected to a pair of hooks 533-534, a display screen 521, and a universal serial bus (USB) cap 522. A male universal serial bus (USB) 535 is located between pair of hooks 533-534. In operation, when pair of buttons 531-532 is simultaneously pressed, pair of hooks 533-534 is squeezed to open by means of a spring mechanism or the like. Otherwise, when buttons 531-532 are not pressed, pair of hooks 533-534 is returned to their initially closed position.

Figure 6:
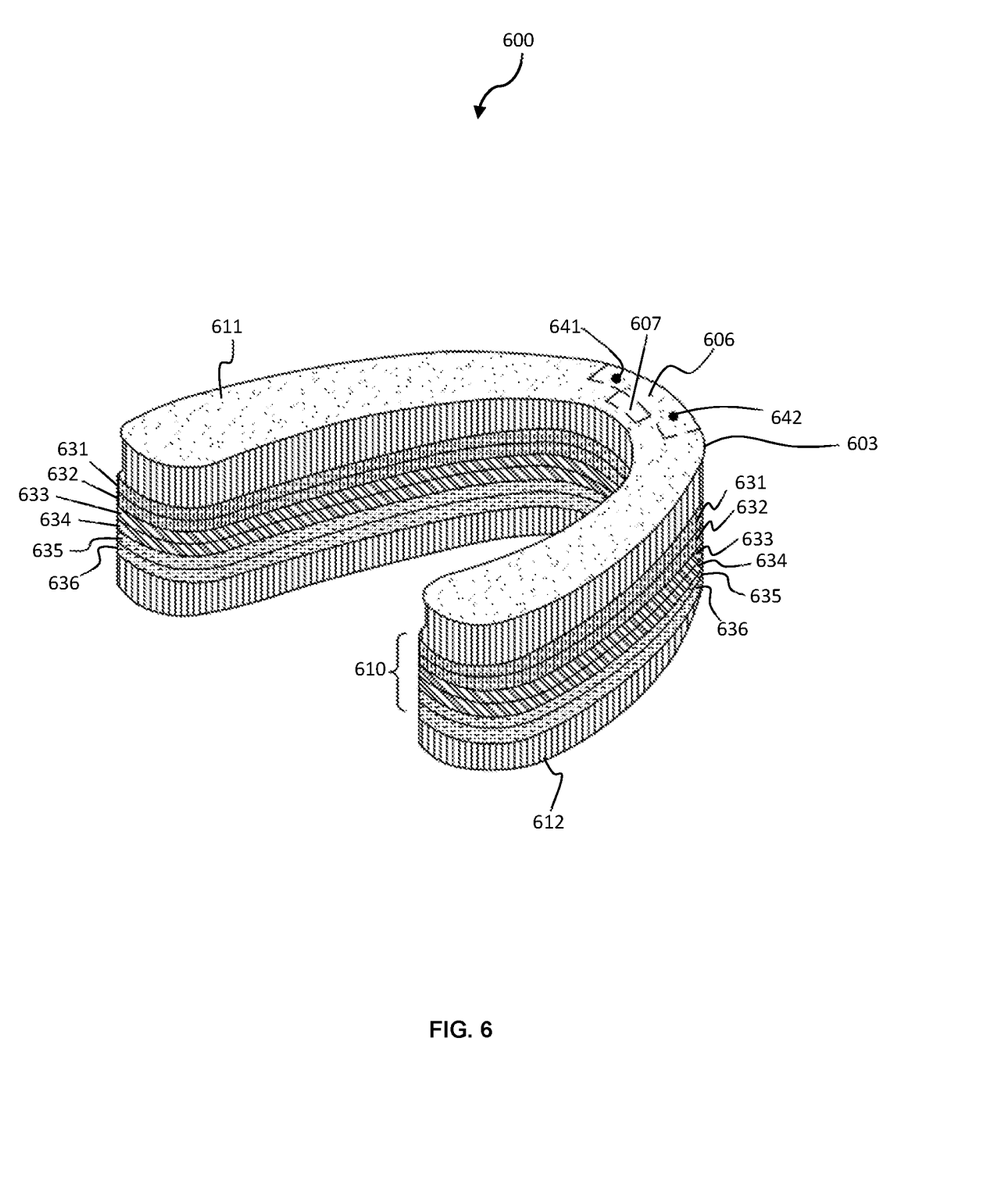
FIG. 6 is a perspective view of a chewing base having a plurality of layers for measuring biting force and pH level of a user in accordance and an universal serial bus (USB) with an exemplary embodiment of the present invention.

Now referring to FIG. 6, a perspective view of a chewing base 600 having a plurality of layers for measuring a biting force, a pH level, and a temperature of a user and a female universal serial bus (USB) with an exemplary embodiment of the present invention is illustrated. At front side 603, a chamber 606 contains a pair of locking pins 641-642 and a female universal serial bus (USB) connector 607. In one exemplary embodiment, chewing base 610 is a soft, compressible multi-layers made of a biocompatible material having elasticity, strength, compressible strength. Chewing base 610 includes—from top to bottom—a pH level layer 631, a first protective layer 632, a force sensing layer 633, a second protective layer 634, a temperature sensing layer 635, and a base layer 636. In many implementations, first protective layer 632, second protective layer 634, and base layer 636 are made of soft silicone materials. In one embodiment, force sensing layer 633 is a force sensing resistor (FSR). When a child chews on chewing base 610, pressures are exerted on the force sensing resistor 633 which, in turn, changes its resistance. A detector (not shown) is used to detect this change in resistance and converts into a force measurement in Newton (N) unit or pound (lb). In other embodiments, force sensing layer 633 can be, but not limited to, piezoelectric materials, quartz force sensors, capacitive sensors, MEMS devices, etc. Finally, pH level meter 631 is well known in the art and needs not to be discussed in details here. Basically, pH level meter 631 includes a glass electrode which has a silver alloy electrical wire submerged in a neutral solution of potassium chloride all contained inside a thin bulb (or membrane) made from a special glass containing salts of metals, such as sodium and calcium; and second, the electrode named the reference electrode which also has a silver alloy electrical wire suspended in a solution of potassium chloride contained inside the same special glass bulb. In the present invention, pH level meter 631 is exposed to saliva so that the pH level can be determined, stored, and displayed. On the other hand, first protective layer 632 and second protective layer 634 can completely seal force sensing layer 633 from exposure to saliva in the mouth of the user.

Figure 7:
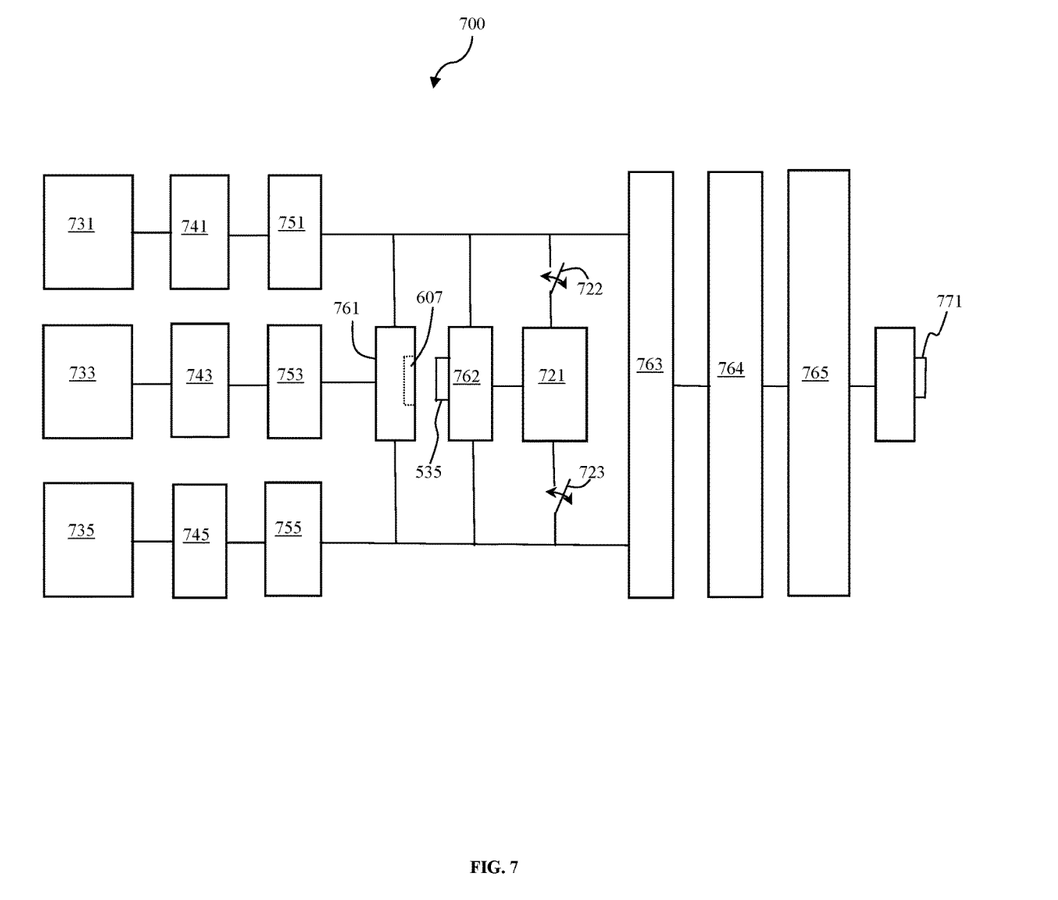
FIG. 7 is a block diagram of the circuit inside the smart toothbrush in accordance with an exemplary embodiment of the present invention.

FIG. 7 is a schematic diagram of an electrical system 700 of toothbrush 500 in accordance with an exemplary embodiment of the present invention. Electrical system 700 includes a pH level circuit 731 connected to pH level meter layer 631, a first sampling circuit 741, a first buffer circuit 751 for storing pH level data after each use. Electrical system 700 also includes a force detector circuit 733 connected to force sensing layer 633, a first sampling circuit 741, a first buffer circuit 751 connected to an output USB circuit 761 and to female USB connector 607. When male USB connector 535 is connected to female USB connector 607, either pH level, temperature, or biting force is selectively displayed on display screen 721 by means of a first switching circuit 722 and a second switching circuit 723. In some other implementations, a temperature sensing circuit 735 is connected to temperature sensing layer 635, a third sampling circuit 745, and a third buffer circuit 755. An audio player 764 is connected to a microcontroller and memory circuit 763 for playing a music score or any audio file. Finally, an output universal serial bus (USB) interface circuit 765 is connected to an input/output male USB connector 771 for exporting data including temperature, biting force, pH level to an external computing device. Input/output USB connector 771 can read audio files and/or other music files into microcontroller and memory circuit 763 for playing different music and audio file to the users.

Figure 8:
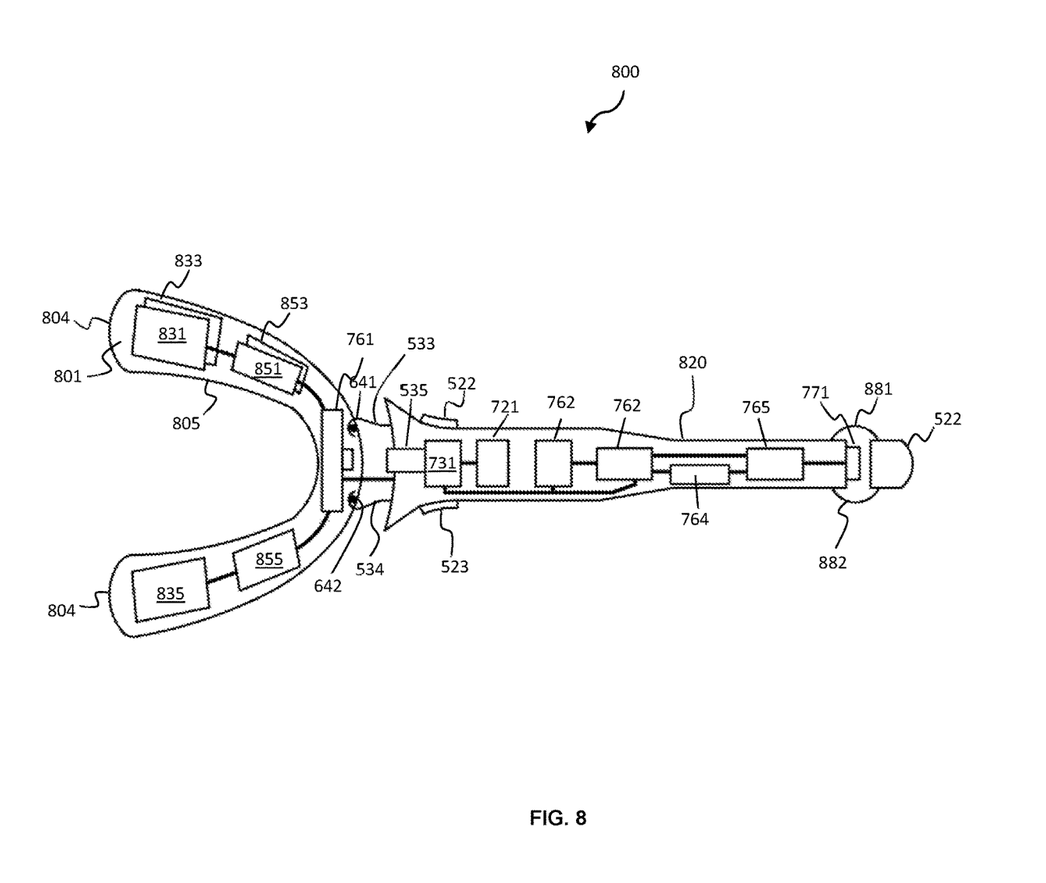
FIG. 8 is a diagram illustrating the arrangement of the electrical circuit inside the smart toothbrush in accordance with an embodiment of the present invention.

Finally referring to FIG. 8, diagram illustrating the arrangement of the electrical circuit inside the toothbrush 800 in accordance with an embodiment of the present invention is illustrated. Inside chewing base 810, a force sensing layer and circuit 833, pH level meter layer and circuit 831, and temperature sensor layer and circuit 835 are deposited. In some implementation, other sensors (not shown) include but not limited to dry mouth sensor that can detect hyposalivation or xerostomia. Other sensors can also include saliva analyzer to detect diabetes, cancer, bad breath, etc. Respective buffers 851, 853, and 855 can be used to store and tabulate these data according to each use or by data of use. Female USB connector 607 is connected to buffers 851, 853, and 855 to read out the outputs of force sensing layer and circuit 833, pH meter layer and circuit 831, temperature sensing layer and circuit 835, and other sensors (not shown). Handle 820 contains male USB connector 522, pair of buttons 531-532, pair of hooks 533-534, display screen 721, microcontroller and memory circuit 763, audio player 764, USB interface circuit 765, and input/output male USB connector 771. In some aspects of the present invention, USB cap 522 is permanently attached to handle 820 by an attachment wires 881-882. With this arrangement, input/output male USB connector 771 is protected by cap 522 which is prevented from being unwittingly lost. Other conventional sliding mechanism that slides input/output male USB connector 771 out of handle 820 can also be used.

In operation, referring back to FIG. 6 to FIG. 8, when front side 803 of toothbrush 800 is inserted first into the mouth of a child, due to his or her auto biological reaction, he or she chews on chewing base 810. During this mastication period, a first array of bristles 611 and a second array of bristles 612 having a uniform height of 0.8 mm brush against and cleaning the child's teeth including the crevices therebetween. In addition, the salivary glands secrete saliva by the chewing action and by phosphate and carbonate ions nano technologically coated in bristles 611 and 712. At this time, the biting forces of the teeth, the pH level, the temperatures, and other salivary information can be measured and stored in buffers 851, 853, and 855. Later on, when the parents of the child user insert removable handle 820 into chewing base 810 by pressing pair of buttons 531-532 to open up pair of hooks 533-534. When pair of hooks 533-534 is inside chamber 606, male USB connector 535 is mated with female USB connector 607. At that moment, parents can release pair of buttons 531-532, pair of hooks 533-534 returns to their initial position and grab on to pair of locking pins 641-642 located inside chamber 601.

Continuing with FIG. 8 and the operation of toothbrush 800 of the present invention, temperature data, pH level data, biting force data, other saliva data are read into microcontroller and memory circuit 764 to store therein. These data can also be displayed on display screen 721. In many implementations, handle 820 is a mini stick computer with USB connector. When input/output male USB connector 771 is connected to an external computer (not shown), data stored in microcontroller and memory circuit can be displayed as shown in Table 1 below so that parents and/or doctors can monitor the oral health of the child.

TABLE 1

History of Use

| Date & Time | Biting Force (N) | pH level | Temperature (° C.) |
|---|---|---|---|
| Jun. 19, 2017 | 150 | 7.0 | 35.5 |
| Jun. 20, 2017 | 175 | 5.5 | 37.5 |

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS

100 Toothbrush
101 top side
102 bottom side
103 front side
104 back side
105 lateral side
110 chewing base
111 top or first array of bristles
112 bottom or second array of bristles
120 handle
121 comfort grip handle
200 toothbrush having an ergonomic handle or
220 ergonomic handle
221 comfort grip handle
300 toothbrush having plurality of islands of bristles
301 front side
302 back side
303 top side
304 bottom side
305 lateral side
306 the width of the front side (canine width)
307 the width of the back side (molar width)
308 the length of the chewing base
309 the surface area of the front side
310 the surface area of the back side
311 top array of plurality of islands of bristles
312 bottom array of plurality of islands of bristles
320 handle
321 comfort grip handle
500 toothbrush with removable handle
501 top side
502 bottom side
503 front side
504 back side
505 lateral side
520 removable handle
521 display screen
522 USB cap
530 toothbrush neck
531 first button in the pair of locking/releasing buttons
532 second button in the pair of locking/releasing buttons
533 first hook in the pair of hooks
534 second hook in the pair of hooks
535 male universal serial bus (USB)
534 removable cap
600 chewing base with multiple sensor layers
603 front side
606 chamber
607 female USB connector
610 chewing base
611 top array of bristles
612 bottom array of bristles
631 pH level meter layer
632 first shielding layer
633 force sensing layer
634 second shielding layer
635 temperature sensing layer
636 third shielding layer
641 a first locking pin in the pair of locking pins
642 a second locking pin in the pair of locking pins
700 electrical circuit of toothbrush
721 display screen
722 first switching circuit
723 second switching circuit
731 pH level meter circuit
733 force sensing circuit
735 temperature sensing circuit
741 first sampling circuit
743 second sampling circuit
745 third sampling circuit
751 first buffer circuit
753 second buffer circuit
755 third buffer circuit
761 USB output circuit
762 USB input circuit
763 microcontroller and memory circuit
764 audio player
765 USB interface circuit
771 input/output male USB connector
801 top side
803 front side
805 lateral side
810 chewing base
820 removable handle
831 pH meter circuit
833 force sensing circuit
835 temperature sensing circuit
851 first buffer circuit
853 second buffer circuit
855 third buffer circuit
881 first attachment in the pair of attachment strings
882 second attachment in the pair of attachment strings

What is claimed is:

1. A smart toothbrush, comprising:
a chewing base further comprising a top side and a bottom side, a front side and a backside, and a lateral side, wherein surface areas of said top side and said bottom side and a width at said front side are smaller than those at the backside and gradually increase toward said backside so that said chewing base has an arch shape conforming to a biting pattern of an upper and lower jaw of a user;
an array of bristles covering only the surface areas of said bottom side and said top side so that when said user chews on said chewing base said array of bristles brushes a front, a back, and biting surfaces of all teeth of said upper jaw and said lower jaw of said user, wherein the height of said array of bristles is 0.8 mm; and a handle connected to said chewing base further comprising a male universal serial bus (USB) operative to receive chewing data from said user.

2. The smart toothbrush of claim 1 wherein said handle is removable further comprises a fastener for removably fastening to said chewing base.

3. The smart toothbrush of claim 2 wherein said fastener further comprises:
a pair of buttons located on opposites sides of said handle and are connected to a pair of hooks via a spring mechanism; and
said front side of said chewing base further comprising a chamber having a pair of locking pins for said pair of hooks to grasp on, wherein when said pair of buttons are simultaneously pressed said pair of hooks opens up stopping grasping to said pair of locking pins and said handle is removed from said chewing base and when said pair of buttons are not pressed said pair of hooks returns to an initial position to grasp on to said pair of locking pins thus fastening said handle to said chewing base.

4. The smart toothbrush of claim 3 wherein said chamber further comprises a female universal serial bus (USB).

5. The smart toothbrush of claim 4 wherein said chewing base further comprises a primary dentition size and a mixed dentition size.

6. The smart toothbrush of claim 5 wherein said array of bristles is arranged in a plurality of islands that matches the teeth pattern of said primary dentition size.

7. The smart toothbrush of claim 5 wherein said array of bristles is arranged in a plurality of groups that matches the teeth pattern of said mixed dentition size.

8. The smart toothbrush of claim 6 wherein said array of bristles is made of a soft silicone material.

9. The smart toothbrush of claim 7 wherein said array of bristles is coated with minerals ion that has a preselected flavor and when passed over said teeth of said user said mineral ion causes said user to excrete saliva to maintain a constant pH level in the mouth of said user.

10. The smart toothbrush of claim 9 wherein said mineral ions are selected from calcium and phosphate ions.

11. The smart toothbrush of claim 10 wherein said chewing base is made from a flexible plastic.

12. The smart toothbrush of claim 10 wherein said chewing base further comprises:
a force sensing layer;
a pH level meter;
a temperature sensing layer;
a force sensing circuit electrically connected to said force sensing layer;
a first buffer circuit for storing a biting force of said user every time said user chew on said chewing base;
a second buffer circuit for storing a pH level of said user every time said user uses said chewing base; and
a third buffer circuit for storing a temperature of said user every time said user chew on said chewing base.

13. The smart toothbrush of claim 12 wherein said force sensing layer is a force sensing resistor (FSR).

14. The smart toothbrush of claim 13 wherein said force sensing layer is a piezoelectric material.

15. The smart toothbrush of claim 14 wherein said handle further comprises:
a display screen located on a top side of said handle for displaying said biting force or said pH level of said user;
a microcontroller and memory circuit;
an audio player circuit for playing a music score among a plurality of music score.

16. The smart toothbrush of claim 15 wherein said handle further comprises:
an output universal serial bus (USB) interface circuit connected to said microcontroller and memory circuit; and
an output universal serial bus (USB) connector, wherein when said output USB is connected to an external computing device, said output USB interface circuit causes said external computing device to display a history of use of said user which includes said biting forces and said pH level.

17. The smart toothbrush of claim 16 wherein said handle further comprises:
an removable cap configured to cover said output USB connector; and
a pair of safety attachments located on opposite sides of said handle and connected to said removable cap and said handle, operative to prevent said cap from being permanently separated from said handle.

18. An dental care package, comprising:
a plurality of chewing bases; and
a removable handle further comprising an universal serial bus (USB) operative to receive chewing data from a user, wherein each of said chewing bases comprises:
a top side and a bottom side, a front side and a backside, and a lateral side, wherein surface areas of said top side and said bottom side and a width at said front side are smaller than those at the backside and gradually increase toward said backside so that said chewing base has an arch shape conforming to a biting pattern of an upper and lower jaw of said user; and
an array of bristles covering only the surface areas of said bottom side and said top side so that when said user chews on said chewing base said array of bristles brushes a front, a back, and biting surfaces of all teeth of said upper jaw and said lower jaw of said user, wherein the height of said array of bristles is 0.8 mm.

19. The dental care package of claim 18 wherein said removable handle further comprises a fastener for removably fastening to each of said plurality of chewing base.

20. The dental care package of claim 19 wherein said fastener further comprises:
a pair of buttons located on opposites sides of said removable handle and are connected to a pair of hooks via a spring mechanism; and
said front side of said chewing base further comprising a chamber having a pair of locking pins for said pair of hooks to grasp on, wherein when said pair of buttons are simultaneously pressed said pair of hooks opens up stopping grasping to said pair of locking pins and said handle is removed from said chewing base and when said pair of buttons are not pressed said pair of hooks returns to an initial position to grasp on to said pair of locking pins thus fastening said handle to said chewing base.

* * * * *